(12) United States Patent
Matsui et al.

(10) Patent No.: US 9,762,789 B2
(45) Date of Patent: Sep. 12, 2017

(54) AUTOFOCUS DEVICE, IMAGING DEVICE, AND AUTOFOCUS METHOD

(71) Applicant: Panasonic Intellectual Property Management Co., Ltd., Osaka (JP)

(72) Inventors: Satoshi Matsui, Kyoto (JP); Masahiro Inata, Hyogo (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/008,882

(22) Filed: Jan. 28, 2016

(65) Prior Publication Data

US 2016/0219213 A1    Jul. 28, 2016

(30) Foreign Application Priority Data

Jan. 28, 2015  (JP) .................................. 2015-013840
Nov. 4, 2015  (JP) .................................. 2015-216308

(51) Int. Cl.
*H04N 5/232* (2006.01)

(52) U.S. Cl.
CPC ............................ *H04N 5/23212* (2013.01)

(58) Field of Classification Search
CPC ................................................ H04N 5/23212
See application file for complete search history.

(56) References Cited

U.S. PATENT DOCUMENTS

| 4,735,494 A * | 4/1988 | Makino .................. G02B 7/282 |
| | | 348/347 |
| 5,574,502 A | 11/1996 | Haruki |
| 5,757,429 A | 5/1998 | Haruki |
| 6,614,998 B1 | 9/2003 | Senba et al. |
| 2010/0054722 A1 | 3/2010 | Endo et al. |
| 2010/0194897 A1* | 8/2010 | Yumiki .................. G03B 7/091 |
| | | 348/208.4 |

FOREIGN PATENT DOCUMENTS

| JP | 7-15648 | 1/1995 |
| JP | 2001-116980 | 4/2001 |
| JP | 2004-361484 | 12/2004 |
| JP | 2010-54730 | 3/2010 |

* cited by examiner

*Primary Examiner* — Tuan Ho
(74) *Attorney, Agent, or Firm* — Wenderoth, Lind & Ponack, L.L.P.

(57) ABSTRACT

An autofocus device includes: an imaging element; an imaging element driver; an imaging element driving controller; a detector; a focus determiner; and a speed parameter calculator. The focus determiner detects a focus position based on a contrast value. The speed parameter calculator calculates a speed parameter used to set a driving speed of the imaging element driver based on the contrast value. The imaging element driving controller performs first and second driving controls for detecting the focus position based on the speed parameter in an autofocus operation. Also, the imaging element driving controller sets, during the first driving control, a driving speed of the imaging element driver for the second driving control.

14 Claims, 7 Drawing Sheets

AUTOFOCUS DEVICE, IMAGING DEVICE, AND AUTOFOCUS METHOD

BACKGROUND

1. Field of the Invention

The present disclosure relates to an autofocus method for automatically focusing a subject image to be photographed to an appropriate focus position when a focus adjustment is performed in an imaging device such as a video camera or a still camera.

2. Description of the Related Art

Unexamined Japanese Patent Publication No. 1107-15648 discloses a video camera having an autofocus function that is capable of varying a driving speed of a focus motor according to an F-number of a lens barrel. In a situation in which a depth of field is deep due to a small aperture, this video camera increases the driving speed of the focus motor to increase a lens displacement per unit time so that a variation in a focus evaluation value becomes large to prevent a malfunction. On the contrary, in a situation in which the depth of field is shallow due to a large aperture, the video camera decreases the driving speed to decrease the lens displacement per unit time so that the lens is prevented from overshooting in the vicinity of a focus point.

The present disclosure provides an autofocus method that allows an imaging element driver to be driven at an appropriate speed during an autofocus operation, and an autofocus device and an imaging device that use the method.

SUMMARY

An autofocus device in accordance with the present disclosure includes: an imaging element; an imaging element driver; an imaging element driving controller; a detector; a focus determiner; and a speed parameter calculator. The imaging element converts a subject image formed on an imaging plane to an electric signal. The imaging element driver drives the imaging element in an optical axis direction. The imaging element driving controller controls the imaging element driver. The detector detects a contrast value of image information obtained from the electric signal. The focus determiner detects a focus position based on the contrast value. The speed parameter calculator calculates a speed parameter based on the contrast value. The imaging element driving controller executes first and second driving controls for detecting the focus position based on the speed parameter in an autofocus operation, and sets, during the first driving control, a driving speed of the imaging element driver for the second driving control.

An imaging device in accordance with the present disclosure can drive the imaging element driver at an appropriate driving speed during an autofocus operation of a contrast detection autofocus system, and thus can achieve high speed autofocus.

DETAILED DESCRIPTION

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid unnecessarily redundant description, and to allow any person skilled in the art to easily understand the description.

Also, it should be noted that the following description and the accompanying drawings are provided for allowing any person skilled in the art to fully understand the present disclosure, and that it is not intended to limit the subject matter described in the claims by the following description.

First Exemplary Embodiment

A digital camera in accordance with a first exemplary embodiment of the present disclosure will be described with reference to FIG. 1 to FIG. 5.

1-1. Configuration 1-1-1. Overall Configuration of Digital Camera

Figure 1:
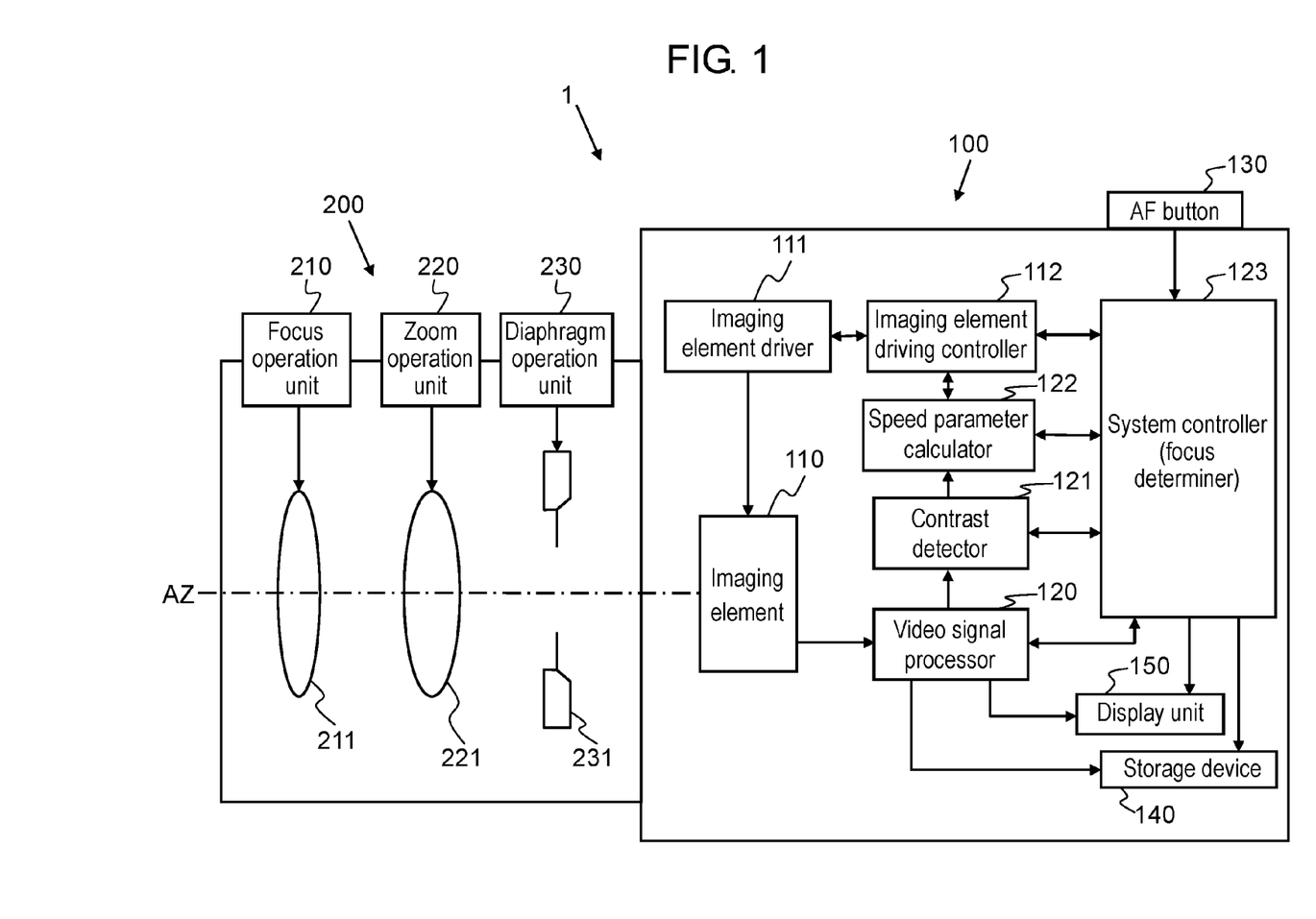
FIG. 1 is a block diagram illustrating a schematic configuration of a digital camera in accordance with a first exemplary embodiment.

FIG. 1 is a block diagram illustrating a schematic configuration of a digital camera in accordance with the first exemplary embodiment.

Digital camera 1 (an example of an imaging device) includes lens barrel 200, and autofocus device 100 (an example of an autofocus device). Lens barrel 200 has a lens mount (not shown) to be detachably attached to autofocus device 100 through a camera mount (not shown) provided in autofocus device 100.

1-1-2. Configuration of Lens Barrel

Lens barrel 200 includes, inside of a casing (not shown), focus lens group 211, zoom lens group 221, and diaphragm 231. Also, lens barrel 200 further includes, on a side surface of the casing, focus operation unit 210, zoom operation unit 220, and diaphragm operation unit 230.

Focus lens group 211, zoom lens group 221 and diaphragm 231 configure as a whole an imaging optical system for forming a subject image. Also, focus operation unit 210 drives focus lens group 211 to move in an optical axis AZ direction. Zoom operation unit 220 drives zoom lens group 221 to move in the optical axis AZ direction. Diaphragm operation unit 230 drives diaphragm 231. Each of focus operation unit 210, zoom operation unit 220 and diaphragm operation unit 230 is a ring member which can be rotated in a circumferential direction. However, each of focus operation unit 210, zoom operation unit 220 and diaphragm operation unit 230 is not limited to such ring member, and may be substituted by any known operation member.

1-1-3. Configuration of Autofocus Device

Autofocus device 100 includes imaging element 110, imaging element driver 111, imaging element driving controller 112, video signal processor 120, contrast detector 121, speed parameter calculator 122, and system controller 123.

Imaging element 110 (an example of an imaging element) converts an optical subject image formed on an imaging plane by an imaging optical system of lens barrel 200 to an electric signal. Imaging element 110 may, for example, be a CCD sensor (charge coupled device sensor). As another example, imaging element 110 may be a CMOS sensor (complementary metal oxide semiconductor sensor).

Imaging element driver 111 (an example of an imaging element driver) drives imaging element 110 in the optical axis AZ direction based on an output of imaging element driving controller 112 which will be described later. Imaging element driver 111 may be an actuator such as, for example, a stepping motor or an electromagnetic linear motor.

Video signal processor 120 processes the electric signal (video signal) converted from the optical subject image by imaging element 110 to obtain image information. Video signal processor 120 outputs the obtained image information to contrast detector 121 and system controller 123. Also, video signal processor 120 outputs the produced image information to storage device 140 such as a memory and display unit 150 having a display screen such as a liquid crystal display.

Contrast detector 121 (an example of a detector) detects a contrast value of the image information output from video signal processor 120. This contrast value is a contrast value dependent on the position of imaging element 110 in the optical axis AZ direction. The contrast value can be obtained by detecting a difference between dark and light of an image provided by the image information output from video signal processor 120. The detected contrast value is output to speed parameter calculator 122 and focus determination unit 123.

Speed parameter calculator 122 (an example of a speed parameter calculator) calculates a speed parameter used to set a driving speed of imaging element driver 111 based on the contrast value detected by contrast detector 121 and a position of imaging element 110. The speed parameter may, for example, be an F-number (aperture value) of lens barrel 200 being used, which can be estimated from a change in the contrast value dependent on the position of imaging element 110 in the optical axis AZ direction. Speed parameter calculator 122 has a table of predetermined contrast shapes (each being a change in the contrast value dependent on a change in the position of imaging element 110 in the optical axis AZ direction) corresponding to the F-numbers. Accordingly, determination of a contrast profile by contrast detector 121 makes it possible to estimate an F-number. The calculated speed parameter (i.e., the F-number, here) is output to imaging element driving controller 112.

System controller 123 (an example of a focus determiner) determines a direction of focus position p (FIG. 2) based on contrast values detected by contrast detector 121, then determines whether or not detection of focus position p is possible, and outputs a determination result. Also, in a case where detection of focus position p is possible, system controller 123 detects focus position p, and outputs a detection result. In addition, system controller 123 controls imaging element driving controller 112, speed parameter calculator 122, contrast detector 121 and video signal processor 120. System controller 123 may, for example, be a microcomputer.

Imaging element driving controller 112 (an example of an imaging element driving controller) controls imaging element driver 111. Specifically, imaging element driving controller 112 sets a driving speed of imaging element driver 111 and a driving direction of imaging element 110 based on the speed parameter calculated by speed parameter calculator 122. The driving speed of imaging element driver 111 may be determined from a speed table for determining a driving speed corresponding to an estimated F-number of lens barrel 200 to be used. Also, the speed table may be previously stored in a memory of imaging element driving controller 112 or storage device 140.

Here, a relation between the contrast value and the F-number will be described with reference to FIG. 8.

Figure 8:
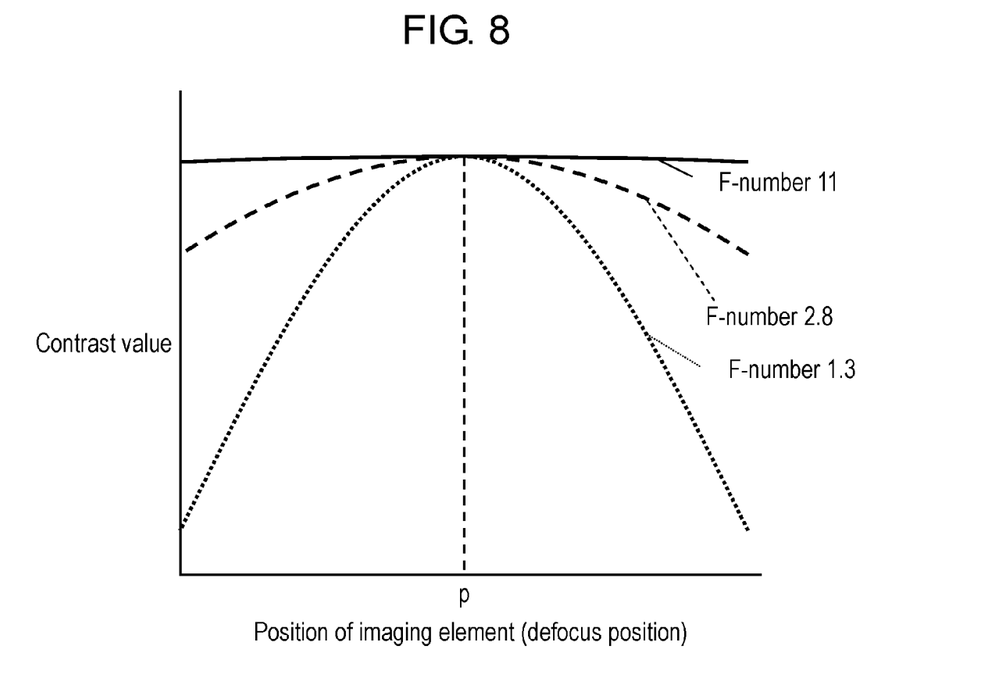
FIG. 8 is a diagram for explaining a relation between an F-number and a contrast value.

FIG. 8 is a diagram for explaining a relation between the F-number and the contrast value. In FIG. 8, the vertical axis indicates the contrast value, and the horizontal axis indicates the position of imaging element 110 in the optical axis AZ direction (defocus position). The change in the contrast value dependent on the change in the position of imaging element 110 becomes slower as the aperture is smaller. Accordingly, the half-value width of the contrast profile, which portrays the change in the contrast value dependent on the change in the position of imaging element 110, becomes larger as the aperture is smaller. On the contrary, the change in the contrast value dependent on the change in the position of imaging element 110 becomes faster as the aperture is larger. Accordingly, the half-value width of the contrast profile becomes smaller as the aperture is larger. In this manner, the F-number of lens barrel 200 can be estimated from the change in the contrast value, even if lens barrel 200 and autofocus device 100 are electrically incommunicable with each other.

If the driving speed of imaging element driver 111 is fast when the aperture is large in the autofocus operation, the interval of detecting the contrast value with respect to the change in the contrast value becomes large, so that the peak position of the contrast value cannot be determined. Accordingly, the driving speed is decreased when the aperture is larger, and increased when the aperture is smaller. In this manner, the interval of detecting the contrast value is decided.

1-2. Operations

Operations of digital camera 1 configured as above will be described hereinafter.

1-2-1. Autofocus Operation

Figure 2:
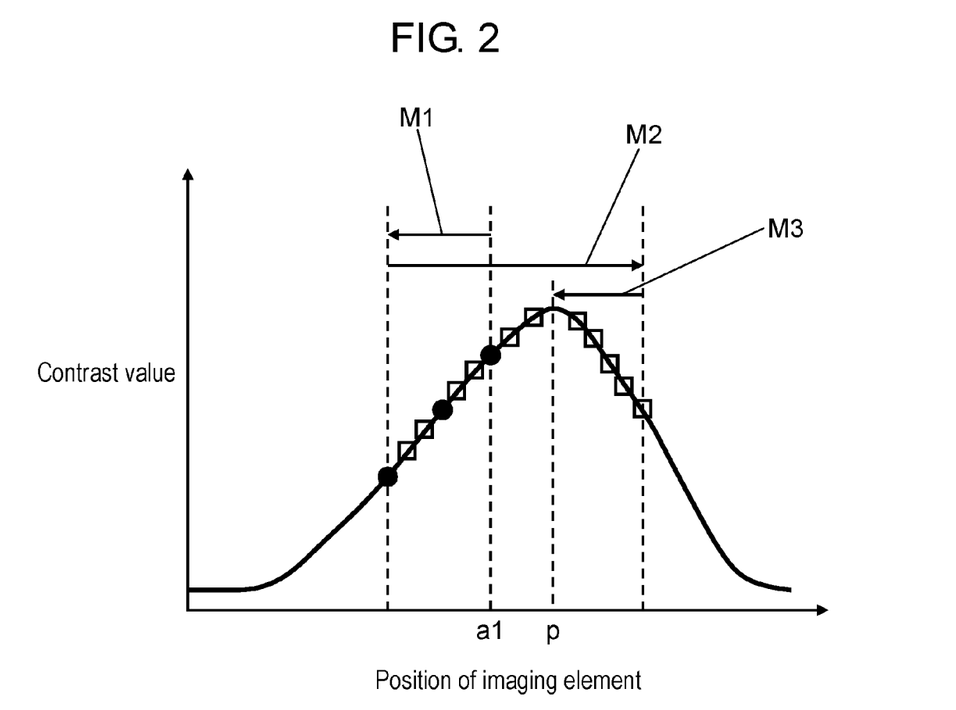
FIG. 2 is a diagram for explaining an autofocus operation of the digital camera in accordance with the first exemplary embodiment.

FIG. 2 is a diagram for explaining an autofocus operation of the digital camera in accordance with the first exemplary embodiment. FIG. 2 shows a relation between the position of imaging element 110 in the optical axis AZ direction and the contrast value during an autofocus operation. In FIG. 2, the vertical axis indicates the contrast value, and the horizontal axis indicates the position of imaging element 110 in the optical axis AZ direction.

In the example shown in FIG. 2, the driving direction of imaging element 110 during initial driving control M1 (an example of a first driving control) in accordance with the first exemplary embodiment is a direction away from focus position p. Accordingly, the contrast value detected by contrast detector 121 reduces.

Imaging element 110 starts the initial driving from autofocus start position a1, which is a position of imaging element 110 at the time the autofocus operation starts. Contrast detector 121 detects the contrast value at predetermined intervals of time (the points indicated by black circle marks in the example of FIG. 2) under initial driving control M1. System controller 123 discriminates whether the contrast is increasing or decreasing, and detects in which direction the peak position (focus position p) exists relative to the position of imaging element 110, or detects the direction toward the peak position.

After the direction of the peak position has been determined by initial driving control M1, imaging element 110 moves toward the peak position by second driving control M2. Contrast detector 121 detects the contrast value at predetermined intervals of time (at the points indicated by square marks in the example of FIG. 2) under second driving control M2. In a case where system controller 123 determines that there exists a peak under second driving control M2, system controller 123 detects the peak position from two points located on both sides of the peak position. System controller 123 can determine existence of the peak position if it has succeeded in detecting contrast values at two points before the peak position and a point which is after the peak position and at which the contrast value is lower than the contrast value at the last point before the peak position.

After the peak position has been detected under second driving control M2, imaging element 110 moves to the peak position, or focus position p, under third driving control M3.

Figure 3:
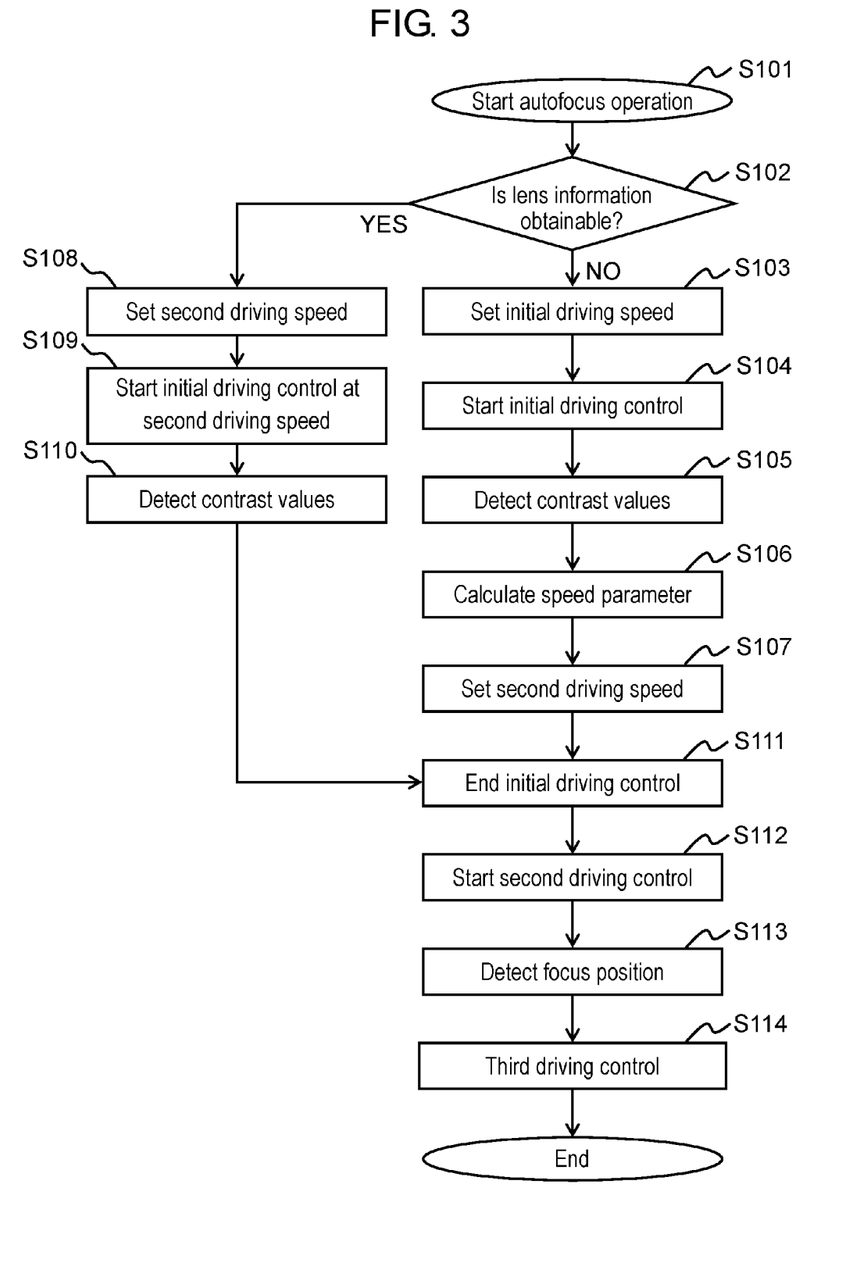
FIG. 3 is a flowchart for explaining an autofocus operation of the digital camera in accordance with the first exemplary embodiment.

FIG. 3 is a flowchart for explaining an autofocus operation of the digital camera in accordance with the first exemplary embodiment. Hereinafter, the autofocus operation of the digital camera in accordance with the first exemplary embodiment will be described with reference to the flowchart of FIG. 3.

First, the user operates focus operation unit 210 to set the position of focus lens group 211 in the vicinity of focus position p. Then, in order to increase the focus accuracy, the user operates AF (autofocus) button 130 provided in autofocus device 100 to start the autofocus operation (step S101).

Next, after the start of the autofocus operation, system controller 123 determines whether or not the lens information can be obtained, or whether or not communication is possible between autofocus device 100 and lens barrel 200 (S102).

Next, description will be made on a case where it is determined impossible to obtain the lens information (NO in S102), or it is determined that communication is impossible between autofocus device 100 and lens barrel 200. First, imaging element driving controller 112 sets a driving speed of imaging element driver 111 during initial driving control M1 (the initial driving speed) (an example of a first driving speed) based on a contrast profile which is estimated to have the smallest half-value width (S103). In other words, the initial driving speed is set based on the smallest estimated F-number. This initial driving speed is the slowest speed in a range of speeds that can be set for imaging element driver 111.

Next, imaging element driving controller 112 starts initial driving control M1 at the initial driving speed set in step S103 (S104).

Next, contrast detector 121 detects contrast values of image information output from video signal processor 120 during initial driving control M1 (S105).

Next, speed parameter calculator 122 calculates a speed parameter by the method described above based on the contrast values detected by contrast detector 121 under initial driving control M1 in step S105 (S106).

Next, imaging element driving controller 112 sets a driving direction of imaging element 110 and a driving speed (the second driving speed) of imaging element driver 111, which are to be applied during second driving control M2 (S107). The second driving speed (an example of a second driving speed) is set based on the contrast values detected by contrast detector 121 and the speed parameter calculated by speed parameter calculator 122.

Imaging element driving controller 112 ends initial driving control M1 at the time it has set the second driving speed (S111).

Next, description will be made on a case where it is determined possible to obtain the lens information in step S102 (YES in S102), or it is determined that communication is possible between autofocus device 100 and lens barrel 200. First, imaging element driving controller 112 sets a second driving speed based on a speed parameter (an F-number here) obtained from the lens information (S108). The lens information is transmitted from a controller (not shown) of lens barrel 200 to speed parameter calculator 122.

Next, imaging element driving controller 112 starts initial driving control M1 at the set second driving speed (S109).

Next, contrast detector 121 detects contrast values of the image information output from video signal processor 120 (S110).

Initial driving control M1 is ended at the time the contrast values have been detected in step S110 (S111). In response to the end of initial driving control M1, system controller 123 determines the direction of the peak position of the contrast value based on the contrast values detected by contrast detector 121 under initial driving control M1.

Next, imaging element driving controller 112 starts to control imaging element driver 111 so that imaging element driver 111 moves imaging element 110 toward the peak position at the second driving speed (S112). The second driving speed at this time is the speed set in step S107 or step S108. Imaging element driving controller 112 may store a speed table for determining a driving speed corresponding to an estimated F-number of lens barrel 200 being used, and may set the second driving speed based on the speed table.

Next, imaging element driving controller 112 moves imaging element 110 toward the peak position (the opposite direction to the direction during initial driving control M1 in the example of FIG. 2) by second driving control M2, and contrast detector 121 detects contrast values. System controller 123 detects focus position p based on the contrast values detected by contrast detector 121 (S113).

After second driving control M2 has been completed, imaging element driving controller 112 executes third driving control M3 to move imaging element 110 to focus position p (S114), and stops imaging element 110 at the peak position of the contrast value.

The autofocus operation ends at the time imaging element 110 has moved to focus position p.

In the first exemplary embodiment, the autofocus operation has been described in a case where system controller (focus determination unit) 123 cannot detect focus position p under initial driving control M1. Although the example described in the present exemplary embodiment is the case where the driving direction of imaging element 110 during initial driving control M1 is away from focus position p, the present disclosure is not limited to such case. That is, the driving direction of imaging element 110 during initial driving control M1 may be a direction approaching focus position p as shown in FIG. 4 and FIG. 5

Figure 4:
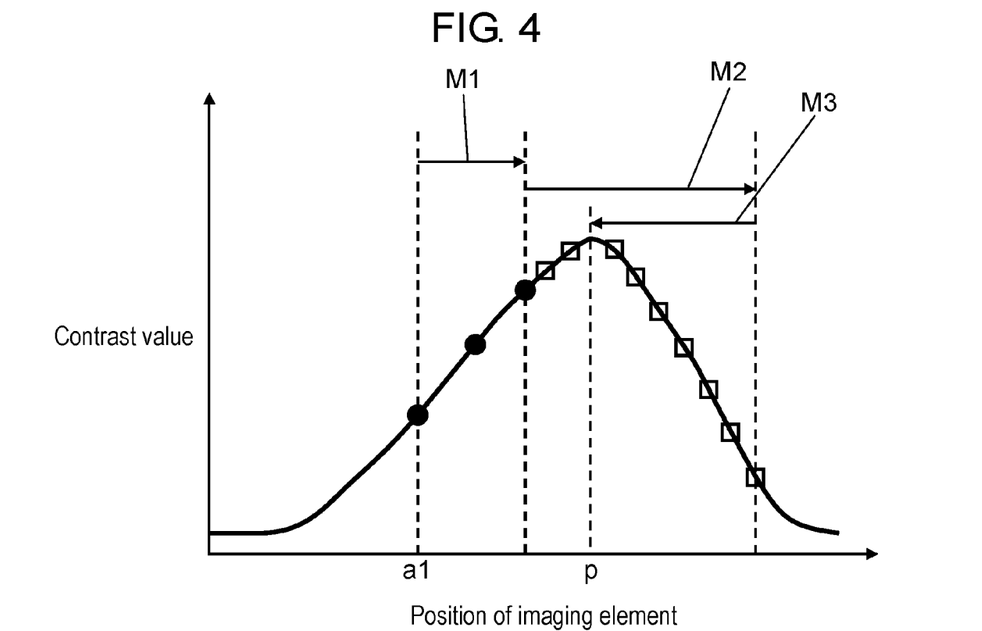
FIG. 4 is a diagram for explaining an autofocus operation of the digital camera in accordance with the first exemplary embodiment.

FIG. 4 is a diagram for explaining another example of autofocus operation of the digital camera in accordance with the first exemplary embodiment. The example shown in FIG. 4 is such a case where imaging element 110 moves toward the peak position of the contrast value, and does not pass through the peak position during initial driving control M1. In this case, imaging element driving controller 112 drives imaging element 110 by second driving control M2 in the same direction as that during initial driving control M1, and contrast detector 121 detects contrast values. System controller 123 detects focus position p based on the contrast values detected by contrast detector 121.

Figure 5:
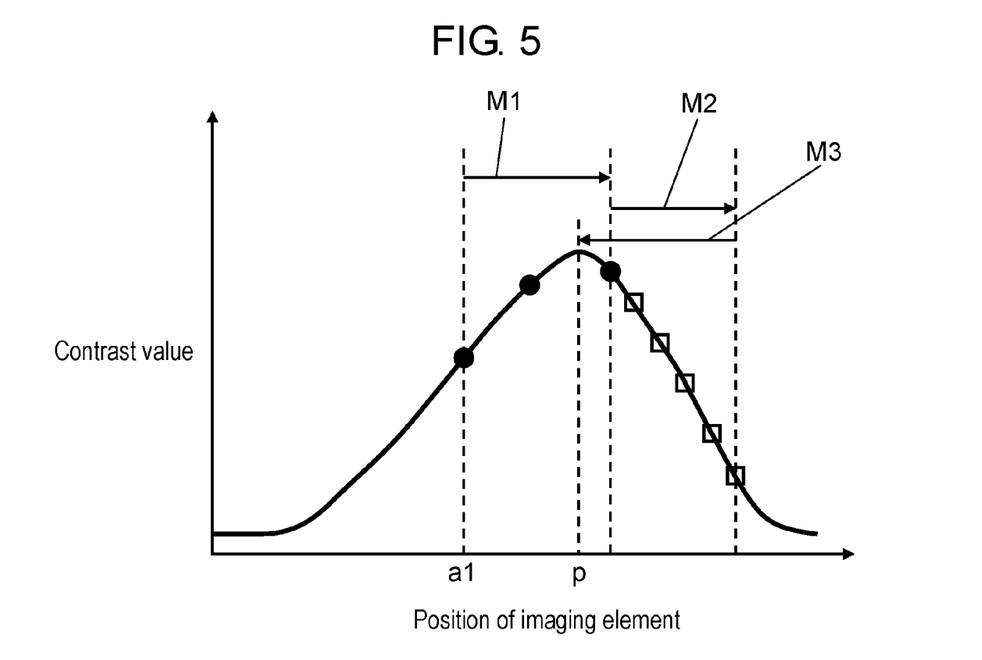
FIG. 5 is a diagram for explaining an autofocus operation of the digital camera in accordance with the first exemplary embodiment.

FIG. 5 is a diagram for explaining still another example of autofocus operation of the digital camera in accordance with the first exemplary embodiment. The example shown in FIG. 5 is such a case where imaging element 110 moves toward the peak position of the contrast value, and passes through the peak position during initial driving control M1. In the case shown in FIG. 5, the contrast value detected last under initial driving control M1 is not lower than the contrast value detected immediately before passing the peak position. In this case, imaging element driving controller 112 executes second driving control M2 by moving imaging element 110 in the same direction as that during initial driving control M1 to detect the peak position.

1-3. Advantageous Effects and so on

As described above, in a case where it is impossible to obtain lens information from the lens barrel, the autofocus device in accordance with the present exemplary embodiment detects contrast values during the initial driving control in an autofocus operation. Then, the autofocus device calculates, based on the detected contrast values, a parameter (F-number) used for setting the driving speed of the imaging element driver which will be used during the second driving control after the initial driving control. Then, the autofocus device sets, based on the calculated speed parameter, a driving speed of the imaging element driver which will be used during the second driving control. Accordingly, even in the case where it is impossible to obtain the lens information, it is possible to appropriately set the driving speed of the imaging element driver according to the lens barrel being used, so that high speed focusing can be realized.

Second Exemplary Embodiment

In a second exemplary embodiment, such a case will be described that focus position p (the peak position of the contrast value) can be detected in initial driving control M1.

2-1. Configuration

Since the configuration of the camera in accordance with the second exemplary embodiment is the same as that of the first exemplary embodiment, explanation on them is omitted, and the same reference marks will be referred to in the following description.

2-2. Operations

An autofocus operation of the digital camera in accordance with the second exemplary embodiment will be described with reference to FIG. 6 and FIG. 7.

Figure 6:
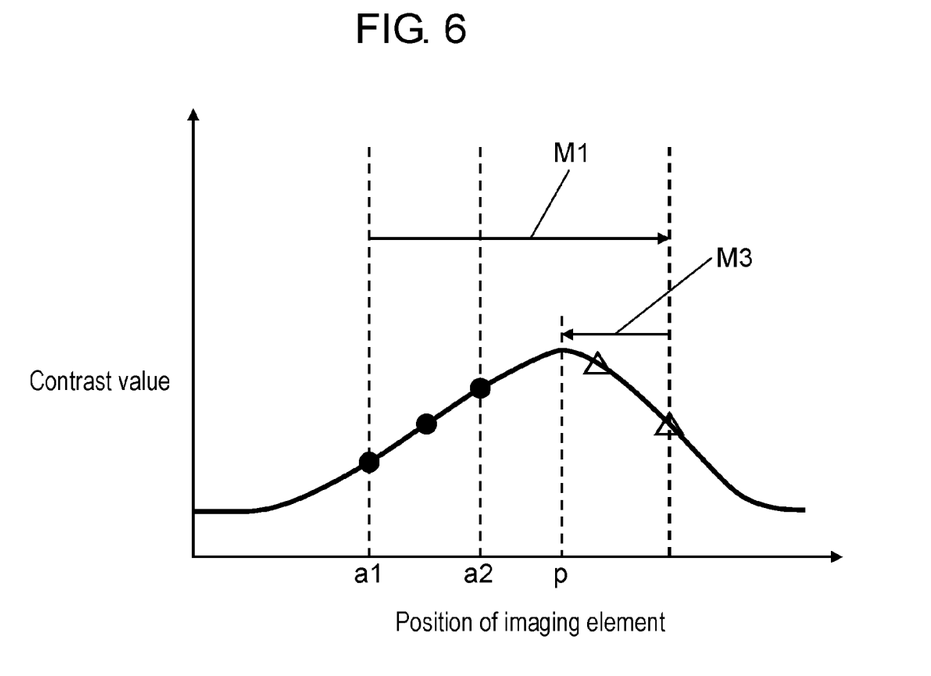
FIG. 6 is a diagram for explaining an autofocus operation of a digital camera in accordance with a second exemplary embodiment.

FIG. 6 is a diagram for explaining an autofocus operation of the digital camera in accordance with the second exemplary embodiment, and shows a relation between the position of imaging element 110 in the optical axis AZ direction and the contrast value in the autofocus operation.

As shown in FIG. 6, in the autofocus operation in accordance with the second exemplary embodiment, the driving direction during initial driving control M1 is the direction approaching focus position p. Further, the last contrast value, which is detected last under initial driving control M1 after imaging element 110 has passed through the peak position, is lower than the contrast value detected immediately before the last contrast value. In this case, the peak position of the contrast value can be detected under initial driving control M1.

Figure 7:
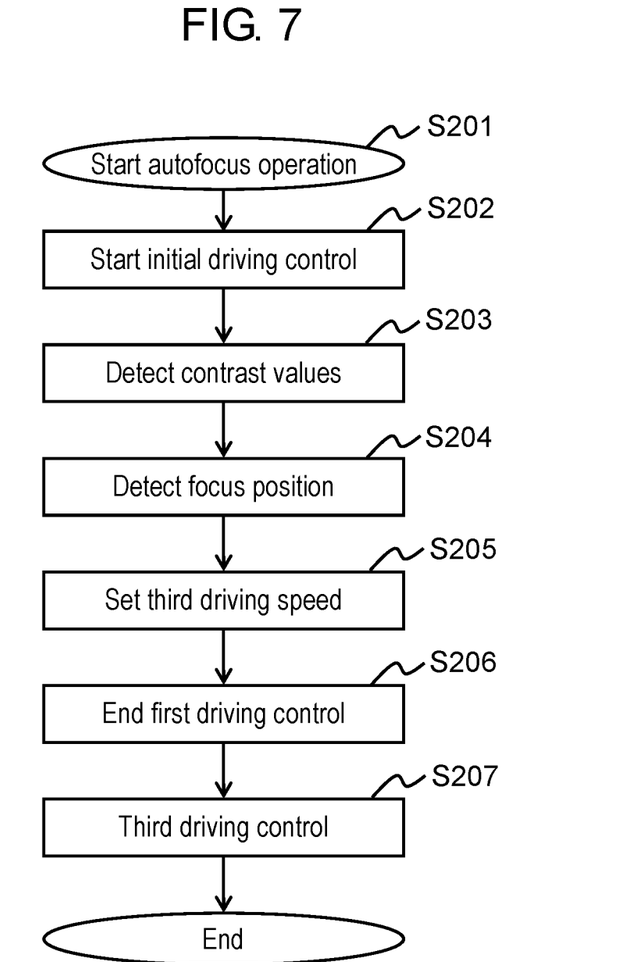
FIG. 7 is a flowchart for explaining an autofocus operation of the digital camera in accordance with the second exemplary embodiment.

FIG. 7 is a flowchart for explaining an autofocus operation of the digital camera in accordance with the second exemplary embodiment. FIG. 7 shows an autofocus operation in a case where system controller (focus determiner) 123 can detect focus position p from the contrast values detected by contrast detector 121 during initial driving control M1. Hereinafter, an operation of digital camera 1 in accordance with the second exemplary embodiment will be described with reference to FIG. 7. Since the operation of the second exemplary embodiment is different from that of the first exemplary embodiment only in the steps after step S102 in the case of "NO", description of the steps in the case of "YES" in step S102 is omitted.

After the autofocus operation has been started (step S201), imaging element 110 first begins to be driven under initial driving control M1. At this time, imaging element 110 moves in the direction toward focus position p (the direction toward the peak position of the contrast value) (S202).

Next, system controller 123 sets a driving speed (an initial driving speed) of imaging element driver 111 used during initial driving control M1 based on a contrast profile which is estimated to have the smallest half-value width. Then, in order to determine whether or not the peak position has been passed based on increase and decrease of the contrast value, contrast values are detected in at least three points (S203).

If it is determined, in step S203, that the change in the contrast value (an example of a speed parameter) is slower than a predetermined gradient as a result of executing initial driving control M1 for a predetermined period of time, the initial driving speed is switched to a faster driving speed. In the example shown in FIG. 6, a speed at which the contrast values are detected at the points indicated by black circle marks is switched at switching point a2 to a speed at which the contrast values are detected at the points indicated by triangle marks (an example of a second driving speed). Since the initial driving speed is set based on the smallest estimated F-number, switching the initial driving speed at switching point a2 to a faster driving speed makes it possible to shorten the time required to determine the peak position direction and the contrast profile.

Assume that contrast values have been obtained under initial driving control M1 at a position before the peak position, a position before the peak position but closer to the peak position, and a position which is past the peak position and at which the contrast value begins declining, as shown in FIG. 5. In this case, focus position p can be detected (S204). Since the peak position can be detected under initial driving control M1, second driving control M2 can be skipped over and third driving control M3 can be executed to perform the autofocus operation to move imaging element 110 to focus position p.

After focus position p has been detected, imaging element driving controller 112 sets a driving speed (third driving speed) of imaging element driver 111 which is faster than at least the driving speed used during initial driving control M1 (S205). This makes it possible to realize speed up of the focusing speed.

Imaging element driving controller 112 ends initial driving control M1 at the time it has set the third driving speed that is applied during third driving control M3 (S206). Further, imaging element driving controller 112 executes third driving control M3 to move imaging element 110 to focus position p (S207). Under third driving control M3, imaging element driving controller 112 controls imaging element driver 111 so as to stop imaging element 110 at the peak position of the contrast value.

The autofocus operation is ended at the time imaging element 110 has been moved to focus position p.

2-3. Advantageous Effects

As described above, an autofocus device of the present exemplary embodiment can estimate the F-number from the detected contrast values, and perform an autofocus operation at a driving speed according to the estimated F-number, even when it is impossible to obtain the lens information. Accordingly, high speed autofocus can be achieved.

Further, high speed autofocus can be achieved by changing the driving speed of the imaging element driver during the initial driving control according to the changing amount of the contrast value detected under the initial driving control.

Other Exemplary Embodiments

In the above description, first and second exemplary embodiments have been described as examples of techniques disclosed in the present application. However, the techniques in accordance with the present disclosure are not limited to the above-described exemplary embodiments, and may be applied to other exemplary embodiments to which modifications, substitutions, additions, and/or omissions are made. Also, the structural components described in the above-described first and second exemplary embodiments may be appropriately combined to configure a new exemplary embodiment.

Examples of such other exemplary embodiments will be described below.

System controller 123 in the first and second exemplary embodiments may have any physical configuration as far as it can control a digital camera. Further, all or some of system controller 123, imaging element driving controller 112, speed parameter calculator 122, contrast detector 121 and video signal processor 120 may be configured as a controller or a control circuit.

Such controller or control circuit is not limited to a microcomputer. However, the controller or the control circuit configured by a microcomputer, which is programmable, is advantageous to increase the freedom of the controller design, because the processing method can be changed by changing the program. Also, the controller or the control circuit may be implemented by a hard-wired logic circuit. Implementing the controller or the control circuit by a hard-wired logic circuit is advantageous to increase the processing speed. The controller or the control circuit may be configured on a single semiconductor chip or may be configured on plural physically separate semiconductor chips. In a case of configuring the controller or the control circuit on plural semiconductor chips, the control steps recited in the appended claims may be respectively implemented on separate semiconductor chips. In this case, it can be understood that one controller is configured by the plural semiconductor chips. Further, the controller or the control circuit may be configured by a semiconductor chip and other functional components (such as, for example, capacitors). Further, a single semiconductor chip may be configured so as to perform the functions of system controller 123 and other functions.

Since the above-described exemplary embodiments are disclosed for the purpose of showing examples of techniques in accordance with the present disclosure, various modifications, substitutions, additions, and/or omissions may be made within a scope of the claims and equivalents thereof.

The present disclosure is applicable to the interchangeable-lens imaging devices. Specifically, the present disclosure is applicable, for example, to digital still cameras, camcorders, mobile phones with camera function, and the like.

What is claimed is:

1. An autofocus device comprising:
   an imaging element that converts a subject image formed on an imaging plane to an electric signal;
   an imaging element driver that drives the imaging element in an optical axis direction;
   an imaging element driving controller that controls the imaging element driver;
   a detector that detects a contrast value of image information obtained from the electric signal;
   a focus determiner that detects a focus position based on the contrast value; and
   a speed parameter calculator that calculates a speed parameter based on the contrast value,
   wherein the imaging element driving controller executes first and second driving controls for detecting the focus position based on the speed parameter in an autofocus operation, and sets, during the first driving control, a driving speed of the imaging element driver for the second driving control.

2. The autofocus device according to claim 1, wherein the speed parameter is calculated by using a contrast profile portraying a change in the contrast value with respect to a change in a position of the imaging element, the contrast profile being estimated based on the contrast value.

3. The autofocus device according to claim 2, wherein the driving speed of the imaging element driver for the first driving control is set by using the contrast profile that is estimated to have a smallest half-value width.

4. The autofocus device according to claim 1, wherein the imaging element driving controller changes the driving speed of the imaging element driver for in the first driving control.

5. The autofocus device according to claim 1, wherein the first driving control is ended when the driving speed of the imaging element driver for the second driving control is set.

6. The autofocus device according to claim 1, wherein the first driving control is ended when the focus position is detected.

7. The autofocus device according to claim 1, wherein, in a case where the focus position is detected under the first driving control, the driving speed of the imaging element driver for the second driving control is set faster than the driving speed of the imaging element for the first driving control.

8. An imaging device comprising:
   the autofocus device according to claim 1; and
   a lens barrel detachably attached to the autofocus device, wherein the autofocus device and the lens barrel are incommunicable with each other.

9. An autofocus method comprising:
   converting a subject image formed on an imaging plane to an electric signal;
   detecting a contrast value of image information obtained from the electric signal;
   detecting a focus position based on the contrast value;
   calculating a speed parameter based on the contrast value;
   executing first and second driving controls for driving the imaging element in an optical axis direction to detect the focus position based on the speed parameter in an autofocus operation; and
   setting, during the first driving control, a driving speed of the imaging element for the second driving control.

10. An autofocus device comprising:
an imaging element that converts a subject image formed on an imaging plane to an electric signal;
an imaging element driver that drives the imaging element in an optical axis direction; and
a control circuit that controls the imaging element driver, detects a contrast value of image information obtained from the electric signal, and detects a focus position of the imaging element based on a contrast value detection result,
wherein the control circuit sets a second driving speed according to a change in the contrast value detected when the imaging element is being driven at a first driving speed, and
the control circuit detects the focus position based on the contrast value detected when the imaging element is being driven at the second driving speed.

11. The autofocus device according to claim 10, wherein the second driving speed is faster than the first driving speed.

12. The autofocus device according to claim 10, wherein the first driving speed is a lowest speed for the imaging element driver.

13. The autofocus device according to claim 10, wherein the control circuit further sets the second driving speed based on a speed parameter dependent on the change in the contrast value, and
the speed parameter indicates an F-number of a lens attached to the autofocus device.

14. The autofocus device according to claim 12, wherein:
in a case where the control circuit determines that the change in the contrast value is slower than a predetermined gradient, the control circuit sets the second driving speed, and detects the focus position based on the contrast value detected when the imaging element is being driven at the second driving speed; and
in a case where the control circuit determines that the change in the contrast value is not slower than the predetermined gradient, the control circuit detects the focus position based on the contrast value detected when the imaging element is being driven at the first driving speed.

* * * * *